Dec. 12, 1961    O. ZIMMERMANN ET AL    3,012,476
PHOTOGRAPHIC OBJECTIVE
Filed Aug. 21, 1958
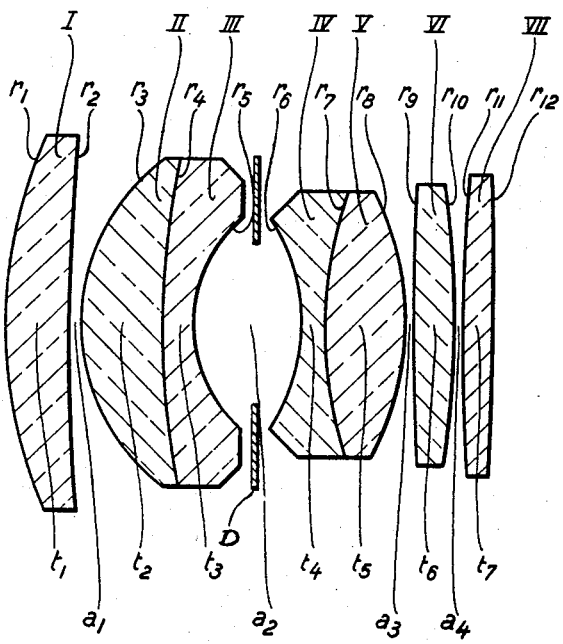
INVENTORS
OTTO ZIMMERMANN
GUSTAV KLEINEBERG
EUGEN HERMANNI
BY Toulmin & Toulmin
ATTORNEYS

United States Patent Office 3,012,476
Patented Dec. 12, 1961

3,012,476
PHOTOGRAPHIC OBJECTIVE
Otto Zimmermann and Gustav Kleineberg, Wetzlar (Lahn), and Eugen Hermanni, Katzenfurt, Germany, assignors to Ernst Leitz, G.m.b.H., Wetzlar, Germany
Filed Aug. 21, 1958, Ser. No. 756,469
Claims priority, application Germany Aug. 24, 1957
4 Claims. (Cl. 88—57)

The present invention relates to a photographic objective.

More particularly, the present invention relates to a Gauss-type photographic objective having a fast speed of the order of F:1.4, wherein a positive member is arranged on the objective side and two positive members are arranged on the picture side and wherein two negative meniscal members which are adjacent the diaphragm and contain a cemented surface that faces the incoming light with its convex side, are arranged between the positive members. When modern high-refracting glasses are used, the Petzval sum in such an objective can be kept small so that conditions necessary for obtaining a good flattening of the image field are met. In known objectives of this type, however, there generally remain some astigmatic zonal aberrations.

It is therefore an object of the present invention to overcome this disadvantage, and with this object in view, the present invention consists mainly in a photographic objective of the above-mentioned type wherein the power $$\frac{N_e' - N_e}{r}$$

of the cemented surface in the second member, i.e., the meniscal member on the objective side, calculated for the focal distance $l$ of the entire objective, is between $+0.02$ and $+0.06$, and wherein the power $$\frac{N_e' - N_e}{r}$$

of the cemented surface in the third member, i.e., the meniscal member on the picture side, similarly calculated for the focal distance $l$ of the entire objective, is between $+0.05$ and $+0.12$.

An embodiment of an objective according to the present invention is illustrated in the figure of the accompanying drawing. The objective comprises five members, as follows:

(1) A first member which is a positive member, arranged on the objective side and constituted by element I;

(2) A second member which is a negative meniscus constituted by elements II and III which are cemented together, the cemented surface common to the two elements being concavo-convex and facing the incoming light with its convex side;

(3) A third member which is a negative meniscus constituted by elements IV and V which are cemented together, the cemented surface common to the two elements being concavo-convex and facing the incoming light with its convex side;

(4) A fourth member which is a positive member, arranged on the picture side and constituted by element VI; and (5) A fifth member which is a positive member, arranged on the picture side and constituted by element VII.

The members are separated by air spaces, with the second and third members, i.e., the negative menisci, being separated by a distance sufficiently great to permit a diaphragm D to be positioned between these members.

For eliminating distortion, it has proved to be advantageous to separate the first and second members from each other a distance which is greater than 2% of the focal length of the objective.

Two practical examples of objectives according to the present invention are set forth herewith:

Example I

[$f$=100 mm.  F:1.4]

| Element | Dimension | $N_e$ | $V_e$ |
|---|---|---|---|
| I | $r_1 = +93.062$<br>$t_1 = 12.25$<br>$r_2 = +418.915$<br>$a_1 = 2.5$ | 1.79128 | 47.4 |
| II | $r_3 = +42.327$<br>$t_2 = 14.75$<br>$r_4 = +150.094$ | 1.64515 | 57.8 |
| III | $t_3 = 5.596$<br>$r_5 = +30.002$<br>$a_2 = 20.25$ | 1.69416 | 30.9 |
| IV | $r_6 = -38.777$<br>$t_4 = 4.058$<br>$r_7 = +81.631$ | 1.67158 | 32.9 |
| V | $t_5 = 15.25$<br>$r_8 = -58.885$<br>$a_3 = 0.5$ | 1.74793 | 44.7 |
| VI | $r_9 = +583.188$<br>$t_6 = 6.75$<br>$r_{10} = -176.50$<br>$a_4 = 0.5$ | 1.79128 | 47.4 |
| VII | $r_{11} = +300.246$<br>$t_7 = 5.096$<br>$r_{12} = -400.825$ | 1.79128 | 47.4 |

In the above table, $r_1, r_2 \ldots$ represent the radii of the individual surfaces, $t_1, t_2 \ldots$ represent the thicknesses of the individual elements, $a_1, a_2 \ldots$ represent the axial air separations between the members, $N_e$ is the index of refraction for the mercury (Hg–$e$) line, and $V_e$ is the corresponding Abbe number.

The glass for the elements I, VI and VII, i.e., for the first, fourth and fifth members, has approximately the following composition:

| Component: | Percentage |
|---|---|
| $B_2O_3$ | 29.5 |
| $La_2O_3$ | 49.0 |
| CdO | 13.5 |
| $ZrO_2$ | 4.0 |
| $Ta_2O_5$ | 4.0 |

For an objective constructed according to the above data, the power $$\frac{N_e' - N_e}{r}$$

for the cemented surface in the second member is 0.033 and for that in the third member is 0.094.

Example II

[$f$=100 mm.  F:1.4]

| Element | Dimension | $N_e$ | $V_e$ |
|---|---|---|---|
| I | $r_1 = +94.11$<br>$t_1 = 12.25$<br>$r_2 = +409.1$<br>$a_1 = 2.5$ | 1.80620 | 44.4 |
| II | $r_3 = +42.59$<br>$t_2 = 14.75$<br>$r_4 = +142.0$ | 1.64515 | 57.8 |
| III | $t_3 = 5.6$<br>$r_5 = +30.37$<br>$a_2 = 20.25$ | 1.70444 | 29.8 |
| IV | $r_6 = -39.25$<br>$t_4 = 4.06$<br>$r_7 = +78.55$ | 1.67764 | 32.0 |
| V | $t_5 = 15.25$<br>$r_8 = -59.09$<br>$a_3 = 0.5$ | 1.74793 | 44.7 |
| VI | $r_9 = +583.2$<br>$t_6 = 6.75$<br>$r_{10} = -181.0$<br>$a_4 = 0.5$ | 1.80620 | 44.4 |
| VII | $r_{11} = +304.8$<br>$t_7 = 5.10$<br>$r_{12} = -411.2$ | 1.80620 | 44.4 | wherein $r_1, r_2 \ldots$ represent the radii of the individual surfaces of said elements, $t_1, t_2 \ldots$ represent the thicknesses of said elements, $a_1, a_2 \ldots$ represent the axial separations between said members, $N_e$ is the index of refraction for the mercury (Hg-$e$) line, and $V_e$ is the corresponding Abbe number.

The glass for the elements I, VI and VII, i.e., the first, fourth and fifth members, has approximately the following composition:

| Component: | Percentage |
|---|---|
| $B_2O_3$ | 28.65 |
| $La_2O_3$ | 39.55 |
| $ZrO_2$ | 7.05 |
| $CdO$ | 14.15 |
| $WO_3$ | 3.50 |
| $Ta_2O_5$ | 7.10 |

For an objective constructed according to the above data, the power $$\frac{N_e' - N_e}{r}$$

for the cemented surface in the second member is 0.037 and for that in the third member is 0.090.

It will be understood that this invention is susceptible to modifications in order to adapt it to different usages and conditions, and, accordingly, it is desired to comprehend such modifications within this invention as may fall within the scope of the appended claims.

What we claim is:

1. A Gauss-type photographic objective the relative aperture of which being of the order of F:1.4 comprising first, second, third, fourth and fifth members, said first member I, being a positive element arranged on the objective side, said second and third members each being a negative meniscus constituted by two elements, II, III and IV, V, respectively, which are respectively cemented together, the cemented surface being convex towards the incoming light with its convex side, and said fourth, VI, and fifth, VII, members, each being a positive element arranged on the picture side, all of said members being spaced from each other with said second and third members being separated by a distance sufficiently great to permit a diaphragm to be positioned therebetween, wherein the power $$\frac{N_e' - N_e}{r}$$

of the cemented surface in said second member, calculated for the focal distance $l$ of the entire objective, is between +0.02 and +0.06, and wherein the power $$\frac{N_e' - N_e}{r}$$

of the cemented surface of said third member, similarly calculated for the focal distance $l$ of the entire objective, is between +0.05 and +0.12, said objective being constructed substantially in accordance with the following data:

[$f$=100 mm.    F:1.4]

| Element | Dimension | $N_e$ | $V_e$ |
|---|---|---|---|
| I | $r_1 = +93.062$<br>$t_1 = 12.25$<br>$r_2 = +418.915$<br>$a_1 = 2.5$ | 1.79128 | 47.4 |
| II | $r_3 = +42.327$<br>$t_2 = 14.75$ | 1.64515 | 57.8 |
| III | $r_4 = +150.094$<br>$t_3 = 5.596$<br>$r_5 = +30.002$<br>$a_2 = 20.25$ | 1.69416 | 30.9 |
| IV | $r_6 = -38.777$<br>$t_4 = 4.058$ | 1.67158 | 32.9 |
| V | $r_7 = +81.631$<br>$t_5 = 15.25$<br>$r_8 = -58.885$<br>$a_3 = 0.5$ | 1.74793 | 44.7 |
| VI | $r_9 = +583.188$<br>$t_6 = 6.75$<br>$r_{10} = -176.50$<br>$a_4 = 0.5$ | 1.79128 | 47.4 |
| VII | $r_{11} = +300.246$<br>$t_7 = 5.096$<br>$r_{12} = -400.825$ | 1.79128 | 47.4 | wherein $r_1, r_2 \ldots$ represent the radii of the individual surfaces of said elements, $t_1, t_2 \ldots$ represent the thicknesses of said elements, $a_1, a_2 \ldots$ represent the axial separations between said members, $N_e$ is the index of refraction for the mercury (Hg-$e$) line, and $V_e$ for the corresponding Abbe number.

2. A photographic objective as defined in claim 1 wherein the elements constituting said first, fourth and fifth members have approximately the following composition:

| Component: | Percentage |
|---|---|
| $B_2O_3$ | 29.5 |
| $La_2O_3$ | 49.0 |
| $CdO$ | 13.5 |
| $ZrO_2$ | 4.0 |
| $Ta_2O_5$ | 4.0 |

3. A Gauss-type photographic objective the relative aperture of which being of the order of F:1.4 comprising first, second, third, fourth and fifth members, said first member I, being a positive element arranged on the objective side, said second and third members each being a negative meniscus constituted by two elements, II, III and IV, V, respectively, which are respectively cemented together, the cemented surface being convex towards the incoming light with its convex side, and said fourth, VI, and fifth, VII, members, each being a positive element arranged on the picture side, all of said members being spaced from each other with said second and third members being separated by a distance sufficiently great to permit a diaphragm to be positioned therebetween, wherein the power $$\frac{N_e' - N_e}{r}$$

of the cemented surface in said second member, calculated for the focal distance $l$ of the entire objective, is between +0.02 and +0.06, and wherein the power $$\frac{N_e' - N_e}{r}$$

of the cemented surface of said third member, similarly calculated for the focal distance $l$ of the entire objective, is between +0.05 and +0.12, said objective being constructed substantially in accordance with the following data:

[$f$=100 mm.    F:1.4]

| Element | Dimension | $N_e$ | $V_e$ |
|---|---|---|---|
| I | $r_1 = +94.11$<br>$t_1 = 12.25$<br>$r_2 = +409.1$<br>$a_1 = 2.5$ | 1.80620 | 44.4 |
| II | $r_3 = +42.59$<br>$t_2 = 14.75$ | 1.64515 | 57.8 |
| III | $r_4 = +142.0$<br>$t_3 = 5.6$<br>$r_5 = +30.37$<br>$a_2 = 20.25$ | 1.70444 | 29.8 |
| IV | $r_6 = -39.25$<br>$t_4 = 4.06$ | 1.67764 | 32.0 |
| V | $r_7 = +78.55$<br>$t_5 = 15.25$<br>$r_8 = -59.09$<br>$a_3 = 0.5$ | 1.74793 | 44.7 |
| VI | $r_9 = +583.2$<br>$t_6 = 6.75$<br>$r_{10} = -181.0$<br>$a_4 = 0.5$ | 1.80620 | 44.4 |
| VII | $r_{11} = +304.8$<br>$t_7 = 5.10$<br>$r_{12} = -411.2$ | 1.80620 | 44.4 | wherein $r_1, r_2 \ldots$ represent the radii of the individual surfaces of said elements, $t_1, t_2 \ldots$ represent the thicknesses of said elements, $a_1, a_2 \ldots$ represent the axial separations between said members, $N_e$ is the index of refraction for the mercury (Hg-$e$) line, and $V_e$ for the corresponding Abbe number.

4. A photographic objective as defined in claim 3 wherein the elements constituting said first, fourth and fifth members have approximately the following composition:

| Component: | Percentage |
|---|---|
| $B_2O_3$ | 28.65 |
| $La_2O_3$ | 39.55 |
| $ZrO_2$ | 7.05 |
| $CdO$ | 14.15 |
| $WO_3$ | 3.50 |
| $Ta_2O_5$ | 7.10 |

References Cited in the file of this patent

UNITED STATES PATENTS

| 2,019,985 | Lee | Nov. 5, 1935 |
| 2,379,392 | Warmisham | June 26, 1945 |
| 2,379,393 | Wynne | June 26, 1945 |
| 2,398,680 | Warmisham | Apr. 16, 1946 |
| 2,532,752 | Baker | Dec. 5, 1950 |
| 2,718,173 | Hacman et al. | Sept. 20, 1955 |
| 2,735,339 | Doi | Feb. 21, 1956 |
| 2,878,723 | Herzberger | Mar. 24, 1959 |

FOREIGN PATENTS

| 804,143 | France | July 27, 1936 |
| 522,651 | Great Britain | June 24, 1940 |